Patented Feb. 9, 1954

2,668,775

UNITED STATES PATENT OFFICE 2,668,775

THERMOPLASTIC REFRACTORIES

James W. Craig, Montreal, Quebec, Canada, assignor to Canadian Refractories Limited, Montreal, Quebec, Canada, a corporation of Canada No Drawing. Application October 30, 1950,
Serial No. 193,035

7 Claims. (Cl. 106—61)

This invention relates to a method of coalescing and setting discrete particles of basic refractory material, as well as to the raw materials used and the thermoplastic product thereof.

The principal object of the invention is to provide suitable raw materials and a method of coalescing discrete particles of dolomite and other lime-bearing refractories into thermoplastic furnace linings and the like of low porosity and consequently of low penetrability by metal and metallurgical slags.

It is also an object of the invention to form thermoplastic refractory masses at exceptionally low temperatures, so that coalescence takes place with great ease and rapidity.

It is a further object to have the necessary reactions take place in situ, that is, after a mixture of discrete particles of dissimilar raw materials has been placed in position on the banks or bottom of a furnace.

A still further object is to attain these desirable ends at very low cost, so that the whole operation is an exceptionally economical one.

In carrying out the invention, discrete coarse and fine particles of refractory material containing both lime in the proportions hereinafter defined and magnesia, such as burned or raw dolomite, are intimately mixed with a relatively small proportion of particles of ferrous silicate or materials which, upon being heated, will readily form ferrous silicate which acts as the coalescing agent for the particles, and the mixture is then placed in the desired position, as on the banks of an open hearth furnace where there has been attack on the refractory lining. Upon application of heat in the presence of air, the ferrous silicate melts at a temperature of 1205° C. (2201° F.) or less, and coalescence of the particles in situ and a series of reactions immediately begin. The precise course of these reactions has not been definitely determined, but in the case of fayalite ($2FeO.SiO_2$) and burned dolomite, it is believed to be approximately as follows:

(1) $2FeO.SiO_2+CaO=CaO.FeO.SiO_2+FeO$
(2) $2FeO+O$ (air) $=Fe_2O_3$
(3) $2CaO+Fe_2O_3=2CaO.Fe_2O_3$
(4) $CaO.FeO.SiO_2+CaO=2CaO.SiO_2+FeO$ The second molecule of ferrous oxide liberated also reacts with oxygen and lime, as in (2) and (3) above. When still more lime is present, further reaction will occur, as follows:

(5) $2CaO.SiO_2+CaO=3CaO.SiO_2$

The over-all reaction may be represented as follows:

(6) $5CaO+2FeO.SiO_2+O$ (air)
    $=3CaO.SiO_2+2CaO.Fe_2O_3$

It is thus seen that several low-melting compounds, such as $2FeO.SiO_2$, $CaO.FeO.SiO_2$ and $2CaO.Fe_2O_3$, at low temperatures, form liquid which can permeate the refractory mass and cause it to coalesce and shrink to form a dense furnace lining, almost impenetrable to the steel and slag. Under these conditions, the silicate liquid continues to react with lime until the resultant highly refractory calcium silicates form a strong bond between the particles. The calcium ferrite formed in situ alone remains as such, giving the mass a desirable degree of thermoplasticity, but in insufficient quantity to lower its refractoriness undesirably.

While burned or raw dolomite is the most generally used refractory material of the type suitable for setting and coalescence in accordance with the invention, one may also use a dolomitic magnesite, or a mixture of dolomite and magnesite, provided there is a sufficient excess of lime over any silica present.

It has been found that the percentage of lime in the material of the particles to be coalesced must be at least equal to the figure obtained by multiplying by 1.87 the sum of the percentage of silica in the material and 3.2—that is at least equal to 1.87 (percent silica +3.2). This insures that there is in the refractory particles more than enough lime to combine with any silica in the refractory material itself, in order that reaction shall subsequently occur with the added coalescing agent. The excess of lime over that necessary for dicalcium silicate formation within the particles is preferably 10% and higher proportions are not objectionable. In order to render the mixture dense and impenetrable to metal and slag, from 3 to 20% of coalescing agent is added to the particles, and 2 to 15% of liquid should persist in the mass at 1450° C. With more than 15% of liquid, drainage has been found to occur, and in the absence of drainage the mass is rendered too plastic for satisfactory service. 3 to 10% of liquid is the preferred range. The amount of lime in the mixture must be at least sufficient to form dicalcium silicate with all the silica present.

It might be supposed that sufficient lime should always be present in a dolomitic magnesite, as it is in a straight dolomite, to combine with both the silica and iron oxide resulting from the oxidation of the ferrous silicate, but it has been found that this is not necessarily the case. One may then get an over-all reaction as follows:

$$2CaO + MgO + 2FeO.SiO_2 + O \text{ (air)} = 2CaO.SiO_2 + MgO.Fe_2O_3$$

Individually, both the dicalcium silicate and magnesium ferrite formed are highly refractory, but it has been discovered that there is a eutectic between them melting at about 1400° C. (2552° F.), hence liquid is maintained at this temperature and the desired shrinkage of the mass occurs. A similar eutectic exists between dicalcium silicate and magnesium aluminate spinel, and the proportion of the latter is often from one to five per cent.

The ferrous silicate is most conveniently added in the form of a slag. Ordinary open hearth slags, such as have long been used with substantially lime-free magnesites, are not satisfactory for the purpose, because they contain too much lime and too little iron oxide to melt at a sufficiently low temperature and to provide a flux capable of bringing about true coalescence of the particles of refractory. Rather, at all readily attainable temperatures, the open hearth slag remains as a distinct constituent between the refractory particles of magnesite, with which little or no reaction takes place, and therefore it does not convert the refractory into the monolithic mass desired.

Most base metal converter slags are of almost ideal composition for use as coalescing agents, containing 20–30% silica and 65–75% ferrous oxide, but they also contain appreciable copper or nickel which can readily be recovered, hence the use of other slags is generally more economical.

In practice, copper and copper-nickel reverberatory furnace slags are among the best and most economical sources of ferrous silicate. They usually melt at 1100–1250° C. (2012–2282° F.), and contain 50–60% of ferrous oxide and 30–38% silica, as well as some alumina and small proportions of lime and other oxides. The alumina is not objectionable, especially since it lowers the melting point of the slag used and readily reacts with the lime of the refractory material to form low-melting calcium aluminate, or, with the ferric oxide, brownmillerite (4CaO.Fe_2O_3.Al_2O_3). In determining whether any ordinary ferruginous slag is suitable for the purpose, it is permissible to consider the usual proportions of both alumina and manganous oxide as equivalent to the same weights of iron oxide.

Copper and copper-nickel blast furnace slags are also sometimes of suitable composition for use with dolomite and other lime-bearing refractories. While base metal blast furnaces are not now used as widely as in the past, there are in many places large dumps of blast furnace slag which can be obtained for the cost of quarrying, loading and crushing to the desired size. Two such slags have compositions as follows:

| $SiO_2$ | FeO | CaO | $Al_2O_3$ | MgO |
|---|---|---|---|---|
| 32.8 | 47.3 | 4.3 | 8.55 | 3.1 |
| 35 | 36 | 6 | 13 | 6 |

Both of these slags will melt at 1150° C. (2102° F.) or below and their content of silica, iron oxide and alumina is sufficient for reaction with the refractory material to form products of the desired type. While the presence of lime and magnesia in the coalescing material is neither necessary nor desirable, small proportions, as here, can be tolerated.

It is not essential, however, that the ferrous oxide and silica be precombined as ferrous silicate, as is the case in the above-mentioned slags. For example, one can use a siliceous siderite ore, or a mixture of siderite and silica in any suitable form. An ore containing 15% quartz and 85% siderite, for example, will on the application of heat lose its carbon dioxide and be converted into material containing about 22% silica and 78% ferrous oxide, which will combine to form a ferrous silicate melting at 1177° C. (2151° F.). A similar result can be obtained by using a purer siderite and adding enough silica to give approximately the same ultimate composition. When the coalescing agent comprises two or more constituents, as in this case, these are advantageously used in mixed and pelletized form, in order to facilitate preferential reaction between them.

Siliceous magnetites and hematites are not satisfactory, however, unless the iron is first reduced to the ferrous condition, for in the ferric condition iron oxide does not combine with silica, nor does it form with silica any low-melting eutectic.

The ferrous silicate or ferrous-silicate-producing material must have a melting point below 1400° C. (2552° F.) and on the basis of its nonvolatile oxide constituents (that is, neglecting carbon dioxide, combined water, etc.), contain a total of at least 45% of ferrous oxide, manganous oxide and alumina, as well as 15–40% of silica.

The grain size of the slag or other preformed ferrous silicate is not of major importance, for the reactions take place similarly whatever the fineness of the material. Generally speaking, it is desirable that the slag have approximately the same range of grain sizes as the refractory material to be set, since segregation is thereby minimized. Other things being equal, very coarse or very fine material is undesirable, the former because of the greater danger of drainage of liquid before reaction has taken place, and the latter because more dust is formed when it is being placed in a furnace. It happens that, for ease of disposal, many slags are granulated in water, and such granulated slags can frequently be used, without further crushing, in admixture with the refractory material.

The optimum quantity of coalescing agent varies somewhat with the properties desired in the ultimate product. For the highest refractoriness, as little as 3% of the weight of refractory material (both on the basis of their solid oxides only) may be desired, whereas if rapid coalescence is of the greatest importance, up to 20% may be used. These form the useful limits in commercial practice. Similarly, as previously stated, from 2 to 15% of liquid should persist at 1450° C. (2642° F.) in the mixture of refractory and coalescing agent, when at chemical equilibrium, and the quantity of liquid should preferably be in the range 3–10%.

Both the procedure and the end product described above are in striking contrast to the normal manufacture and use of so-called "double-burned dolomite" in fettling open hearth furnaces. Before burning such dolomite, fine rock is screened out, and particles of nearly uniform size are passed through a rotary kiln with a small amount of iron oxide. Reaction takes place in the kiln between the lime of the dolomite and the iron oxide, and the calcium ferrite formed penetrates the still porous and unconsolidated dolomite particles and shrinks them individually to dense discrete granules, with substantially no fines. Little silica is usually present, and this is substantially all inside the particles, where it reacts with lime to form a little dicalcium or tricalcium silicate. These granules are subsequently used as such in fettling steel furnaces. The calcium ferrite then undoubtedly melts, but most of it is already inside the particles, and it does little more than make the particles adhere loosely together, while the small amount of silicate inside the particles is far too refractory to melt or soften, even at maximum furnace temperature, and it therefore does not act as a bond between the particles. The final product then consists of a somewhat sticky mass of relatively loose particles having a substantial proportion of voids, which are readily penetrated by liquid metal or slag. The mass is radically different from the far denser monolithic product strongly bonded by refractory calcium silicate as obtained by the method herein described.

The most important applications of this invention are found in the fettling and bottom-forming operations in open hearth steel furnaces, using respectively dolomite and dolomitic magnesite in admixture with suitable coalescing agents. The atmosphere is sufficiently oxidizing to convert the liberated ferrous oxide to ferric oxide, there is an abundance of lime present, and the temperature is more than adequate for the fusion of both the ferrous silicate and the non-refractory products of the reactions taking place. The plastic nature of the product formed under these conditions leads to the development of high density, which is often more important than the highest degree of refractorines.

The same principle, however, can be applied in a number of other ways. By developing a condition of pastiness or stickiness in the refractory materials used, they may be made suitable for application through a gun to vertical back walls of open hearth furnaces and in repairing tapholes. Such properties are also desirable in ramming materials to be used for permanent bottoms of open hearth furnaces and in new taphole construction. Cements may be similarly compounded for use in many types of high temperature operations, including not only open hearth furnaces but also electric and reheating furnaces and cupolas in the steel industry, base metal furnaces, rotary kilns, etc.

What is claimed is:

1. A batch mixture for thermoplastic refractories consisting essentially of two unreacted constituents, the first constituting from 80 to 97% by weight of the batch mixture and consisting of highly refractory basic particles composed essentially of magnesia and lime and selected from the group consisting of raw and burned dolomite and raw and burned dolomitic magnesite, and the second constituting from 3% to 20% by weight of the mixture on the basis of its non-volatile constituents, and being a coalescing agent having a melting point not higher than 1400° C. and containing 15% to 40% of silica and at least 45% of metal oxide from the group consisting of ferrous oxide, manganous oxide and alumina, of which ferrous oxide constitutes the major portion, the quantity of lime in the said batch mixture being at least sufficient to form dicalcium silicate with all the silica therein.

2. A batch material as defined in claim 1 in which the coalescing agent is a base metal reverberatory furnace slag having a melting point not higher than 1250° C.

3. A batch material as defined in claim 1 in which the coalescing agent is a base metal blast furnace slag having a melting point not higher than 1150° C.

4. A batch material is defined in claim 1 in which the coalescing agent contains ferrous carbonate.

5. A batch material as defined in claim 1 in which the basic refractory particles and the coalescing agent are of approximately the same range of particle size.

6. A composition as defined in claim 1 which has been burned in situ and contains 2 to 15% of ferruginous liquid under equilibrium conditions at 1450° C.

7. A method of making thermoplastic refractory masses which comprises mixing 80 to 97 parts by weight of highly refractory basic particles consisting essentially of magnesia and lime and selected from the group consisting of raw and burned dolomite and raw and burned dolomitic magnesite with 3 to 20 parts by weight of a coalescing agent containing 15 to 40% of silica and at least 45% of metal oxide from the group consisting of ferrous oxide, manganous oxide and alumina of which ferrous oxide constitutes the major portion, said weights being those of the non-volatile constituents of the basic particles and the coalescing agent, the weight of lime present in the overall mixture being at least 1.87 times the weight of silica, and heating the mixture in situ to bring about reaction between the lime and the silica, and between the oxygen of the air and the liberated ferrous oxide, and to convert the ferric oxide formed into a ferruginous liquid to develop thermoplasticity and effect shrinkage at temperatures in the range 1100 to 1450° C. (2012 to 2642° F.).

JAMES W. CRAIG.

References Cited in the file of this patent

UNITED STATES PATENTS

| Number | Name | Date |
|---|---|---|
| 1,206,771 | Barr | Nov. 28, 1916 |
| 1,483,469 | Meyer | Feb. 12, 1924 |